(12) United States Patent
Talon et al.

(10) Patent No.: US 12,117,369 B2
(45) Date of Patent: Oct. 15, 2024

(54) SYSTEM AND METHOD FOR LEAK TESTING A SEALED PACKAGE

(71) Applicant: Packaging Technologies & Inspection, LLC, Hawthorne, NY (US)

(72) Inventors: Quentin Talon, Clarens (CH); Anton Stauffer, Crans Montana (CH); Heinz Wolf, Hackettstown, NJ (US); Oliver Stauffer, Armonk, NJ (US)

(73) Assignee: Packaging Technologies & Inspection, LLC, Hawthorne, NY (US)

( * ) Notice: Subject to any disclaimer, the term of this patent is extended or adjusted under 35 U.S.C. 154(b) by 209 days.

(21) Appl. No.: 17/807,434

(22) Filed: Jun. 17, 2022

(65) Prior Publication Data

US 2023/0408365 A1   Dec. 21, 2023

(51) Int. Cl.
  *G01M 3/32*   (2006.01)
(52) U.S. Cl.
  CPC .................... *G01M 3/32* (2013.01)
(58) Field of Classification Search
  CPC .................. G01M 3/32; G01M 3/34
  See application file for complete search history.

(56) References Cited

U.S. PATENT DOCUMENTS

| | | |
|---|---|---|
| 3,455,092 A | 7/1969 | Llewellyn |
| 3,837,228 A | 9/1974 | Nemeth et al. |
| 5,513,516 A | 5/1996 | Stauffer |
| 6,050,133 A | 4/2000 | Achter et al. |
| 6,450,011 B1 * | 9/2002 | Mayer .................. G01M 3/329  73/49.3 |
| 6,450,012 B1 | 9/2002 | Mayer et al. |
| 6,513,366 B1 * | 2/2003 | Stauffer .................. G01M 3/34  73/49.3 |
| 6,609,414 B2 | 8/2003 | Mayer et al. |
| 7,422,627 B2 | 9/2008 | Wetzig |
| 7,905,132 B1 | 3/2011 | Chamberlain |
| 8,756,978 B2 | 6/2014 | Schwartz et al. |
| 2010/0139375 A1 | 6/2010 | Johns et al. |
| 2011/0174060 A1 * | 7/2011 | Guazzo ............... G01M 3/3281  73/40.7 |
| 2013/0267868 A1 | 10/2013 | Connors et al. |
| 2016/0091386 A1 | 3/2016 | Gerdau |

OTHER PUBLICATIONS

International Search Report and Written Opinion issued in PCT Application No. PCT/US26/66173, mailing date Nov. 29, 2023.

\* cited by examiner

*Primary Examiner* — David Z Huang
(74) *Attorney, Agent, or Firm* — Benesch Friedlander Coplan & Aronoff LLP (57) ABSTRACT

A system is provided for leak testing a package having a body with an opening, a gas permeable material reaching over the opening, and an adhesive bond attaching the gas permeable material to the body beside the opening. The system includes a coupling element configured to connect with the package to enable potential leakage air flow paths into the coupling element, including a) from inside the package through the opening and further through the gas permeable material, and b) from an ambient atmosphere into the package and further through the gas permeable material.

20 Claims, 8 Drawing Sheets

SYSTEM AND METHOD FOR LEAK TESTING A SEALED PACKAGE

TECHNICAL FIELD

This technology includes systems and methods for leak testing a sealed package.

BACKGROUND

A package may be sealed to protect the contents from contamination. For example, a sterile package may be sealed to block the entry of bacteria and other microorganisms. Conventionally, such a package is tested via vacuum decay leak detection while the package is enclosed in a vacuum chamber.

SUMMARY

A system is provided for leak testing a package having a body with an opening, a gas permeable material reaching over the opening, and an adhesive bond attaching the gas permeable material to the body beside the opening.

The system includes a coupling element. The coupling element is configured to connect with the package to enable potential leakage air flow paths into the coupling element, including a) from inside the package through the opening and further through the gas permeable material, and b) from an ambient atmosphere into the package and further through the gas permeable material.

Other elements of the system include a vacuum pump and a pressure sensor. The vacuum pump is operatively connected to the coupling element to apply test evacuation pressure to the leakage air flow paths. The pressure sensor is operative to sense test evacuation pressure in the coupling element. A controller is configured to monitor a test evacuation pressure profile in the coupling element, compare the test evacuation pressure profile to a reference evacuation pressure profile of a reference package that does not have a leak, and determine whether there is a leak in the package based on the comparison.

A method is provided for leak testing a package having a body with an opening, a gas permeable material reaching over the opening, and an adhesive bond attaching the gas permeable material to the body beside the opening.

The method includes coupling a vacuum system to the package to enable potential leakage air flow paths into the vacuum system, including a) from inside the package through the opening and further through the gas permeable material, and b) from an ambient atmosphere into the package and further through the gas permeable material.

The method also includes actuating the vacuum system to apply test evacuation pressure to the leakage air flow paths, monitoring a profile of the test evacuation pressure, and determining whether there is a leak in the package based on a comparison between the teat evacuation pressure profile and a reference evacuation pressure profile of a reference package that does not have a leak.

DETAILED DESCRIPTION

Figure 1:
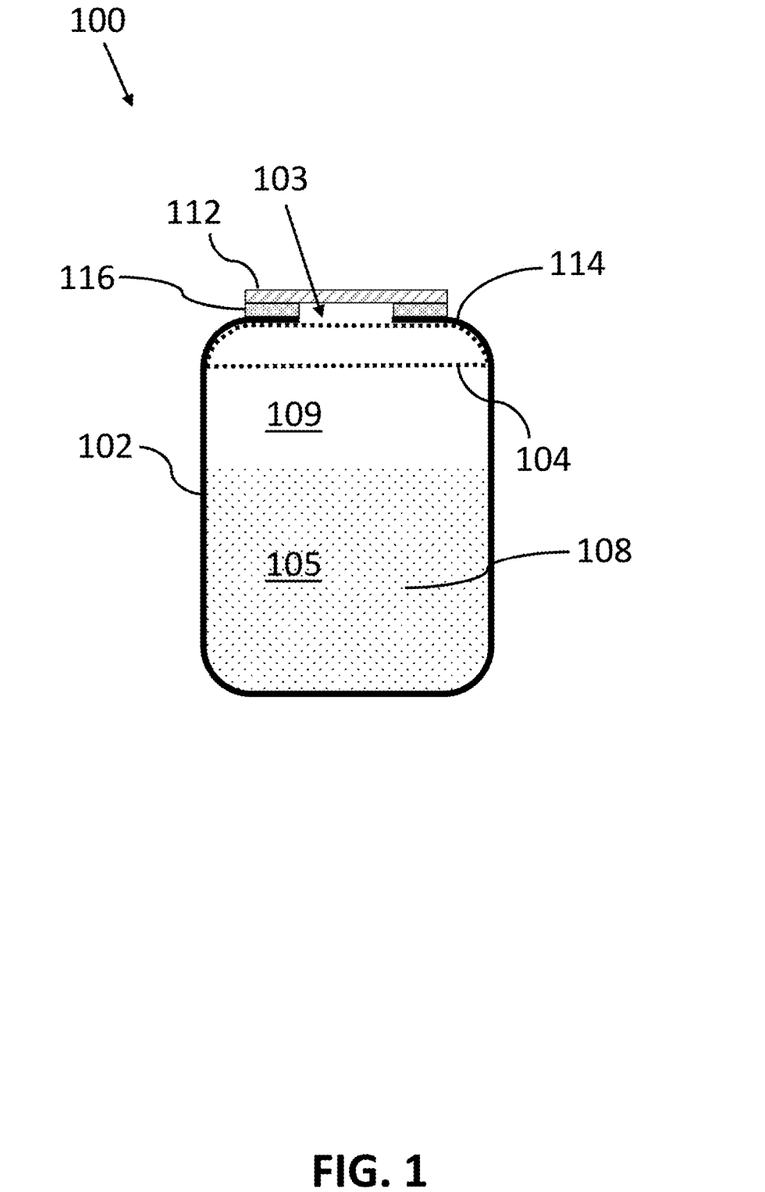
FIG. 1 is a schematic side view of a sealed package.

As shown in FIG. 1, a package 100 includes a body 102 with an opening 103. The body 102 defines a storage volume 105 which, in the illustrated example, is partially filled with contents 108 beneath a headspace 109. The contents 108 may be solid, liquid, or a mixture of both. The body 102 is formed of non-gas permeable material that may be either rigid or flexible as needed for the package 100 to function as a cartridge, syringe, pouch, vial, or the like. A closure element 112 closes the opening 103. Unlike the body 102, the closure element 112 is formed of gas permeable material. The package 100 may alternatively include a non-gas permeable stopper 104 (e.g., a rubber stopper) beneath the opening 103, and in this embodiment, the headspace 109 is between the non-gas permeable stopper 104 and the closure element 112.

The closure element 112 reaches fully over and across the opening 103 to cover the opening 103. The closure element 112 further reaches over an exterior surface portion 114 of the body 102 that surrounds the opening 103. An adhesive bond 116 attaches the closure element 112 to the exterior surface portion 114 of the body 102 fully about the periphery of the opening 103. Accordingly, the opening 103 is closed by the gas permeable material of the closure element 112, and is sealed by the surrounding adhesive bond 116 between the gas permeable material of the closure element 112 and the non-gas permeable material of the body 102.

The gas permeable material of the closure element 112 may be is a high-density polyethylene (PDPE), such as Tyvek®. The gas permeable material of the closure element 112 may be paper. The gas permeable material of the closure element 112 may be a one-way valve allowing airflow out from the package 100, but not into the package 100. The body 102 of the package 100 in the given example is formed of a single piece of non-gas permeable material, but may alternatively have multiple parts such as, for example, an aluminum/plastic film or wrapper or a crimping element that defines the exterior surface portion 114 at which the adhesive bond 116 seals the opening 103.

Figure 2:
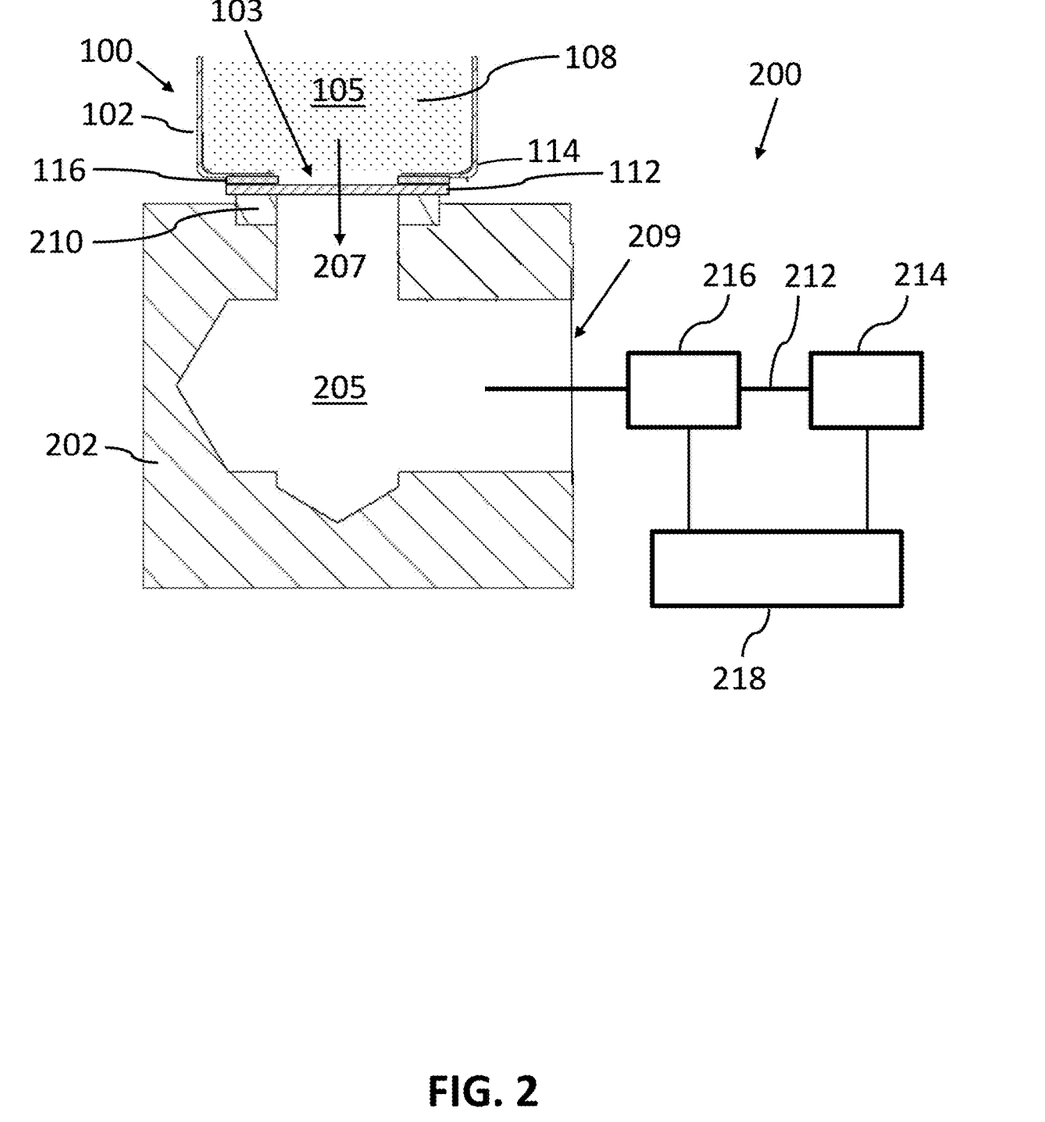
FIG. 2 is a schematic side view showing the package of FIG. 1 coupled to a leak testing system.

As shown in FIG. 2, the package 100 is coupled to a leak testing system 200. The system 200 includes a coupling element 202 oriented to receive and support the package 100 in an inverted testing position as shown. The package 100 is thus arranged for vacuum pressure in the system 200 to evacuate air from the package 100 downwardly through the closure element 112 at the opening 103. The inverted arrangement enables more convenient manual handling of the package 100 as compared with an upright arrangement in which the package 100 is engaged with the coupling element 202 from beneath. However, an upright arrangement might be preferred if the contents would impede the passage of air downward through the storage space 105 to the opening 103.

As further shown in FIG. 2, the coupling element 202 defines an air flow passage 205 with an inlet 207 and an outlet 209. The coupling element 202 includes a gasket 210 that supports the package 100 in the testing position with the opening 103 aligned with the inlet 207. A conduit 212 communicates a vacuum pump 214 with the outlet 209. A pressure sensor 216 is operatively connected to the conduit 212. The test system 200 also includes a controller 218 for operating the vacuum pump 214 and the pressure sensor 216.

The controller 218 may be a computer or may include any suitable processer(s), microprocessor(s), transceiver(s), memory, a timer, analog-to-digital convertor(s) (ADC), programmable logic controller(s) (PLC), human machine interface(s) (HMI), etc. to enable its functions as disclosed and claimed. The controller 218 may further include any suitable user interface and/or display to allow output of the test results and allow a user to program or control the operation of the test system 200.

Figure 3:
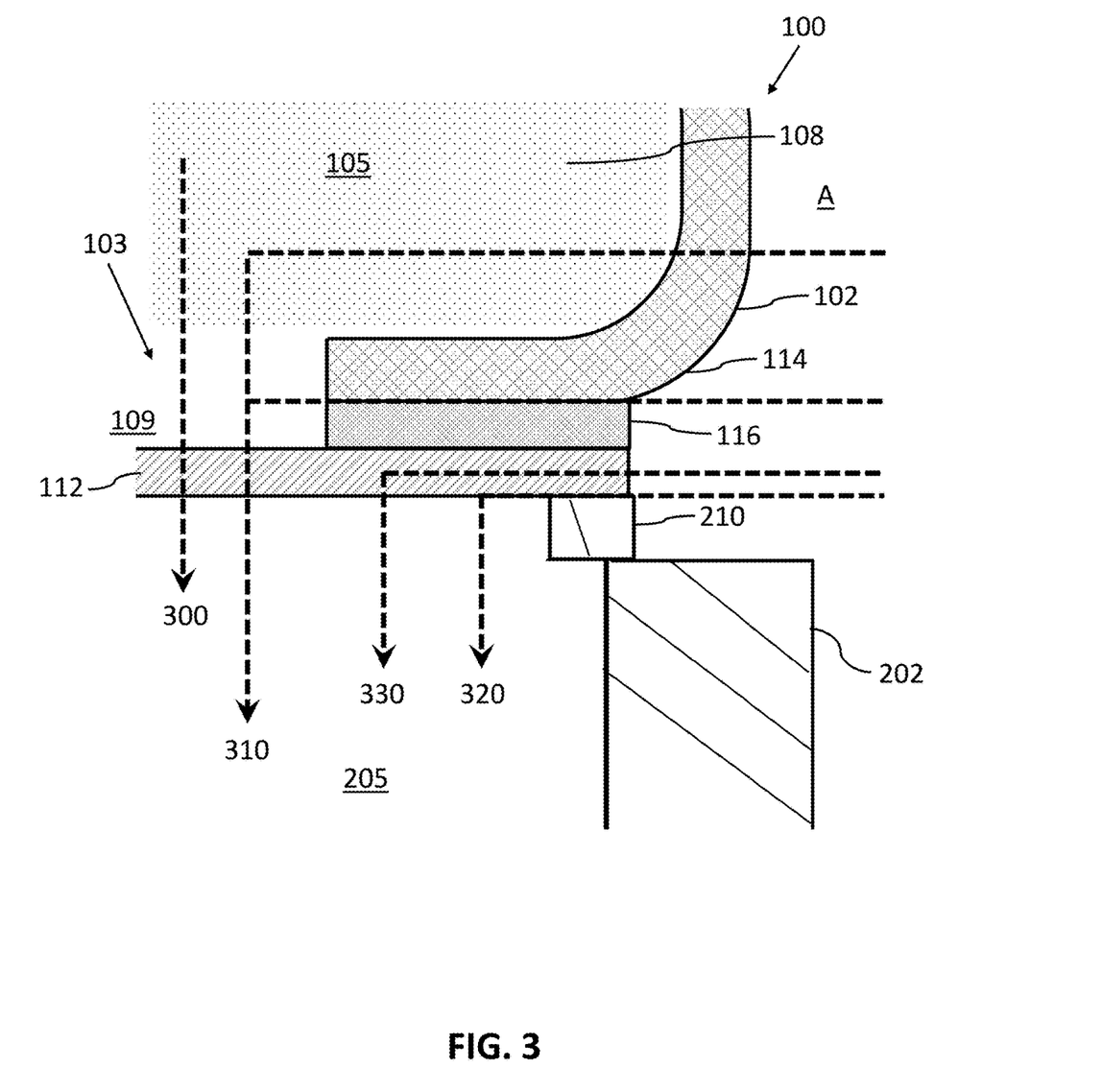
FIG. 3 is an enlarged partial view of parts shown in FIG. 2.

As shown in enlarged detail in FIG. 3, the coupling element 202 and the package 100 together enable potentially multiple air flow paths into the passage 205. These include an air flow path 300 that originates inside the package 100 (e.g., the headspace 109 and/or the storage space 105) and reaches outward through the opening 103 and the closure element 112 at the opening 103. One or more additional air flow paths 310 that reach outward though the opening 103 and the closure element 112 may originate in the ambient atmosphere A and then enter the storage space 105 (or the headspace 109) through a leak in the package 100. The leak may be in the body 102 of the package 100, in the adhesive bond 116, or may be located between the body 102 and a film, wrapper, crimping element, or other separate part of the package 100 as noted above. Another gas flow path 320 may originate in the ambient atmosphere A and enter the passage 205 through a leak between the closure element 112 and the coupling element 202 (e.g., the gasket 210). Yet another air flow path 330 may reach from the ambient atmosphere A to the passage 205 solely through the gas permeable material of the closure element 112. In each case the air flow rate through the closure element 112 depends on the pore size of the gas permeable material of which it is formed. The flow rate along any of the air flow paths 300, 310, 320, and 330 can increase significantly if a pinhole is present in the gas permeable material of the closure element 112.

In the performance of a leak test, the controller 218 actuates the pump 214 to provide evacuation pressure in the conduit 212 and the passage 205. The evacuation pressure draws air to flow along one or more of the air flow paths 300, 310, 320, and 330. The controller 218 also monitors evacuation pressure profiles as detected by the sensor 216, and thereby determines if a leak is present.

Figure 4:
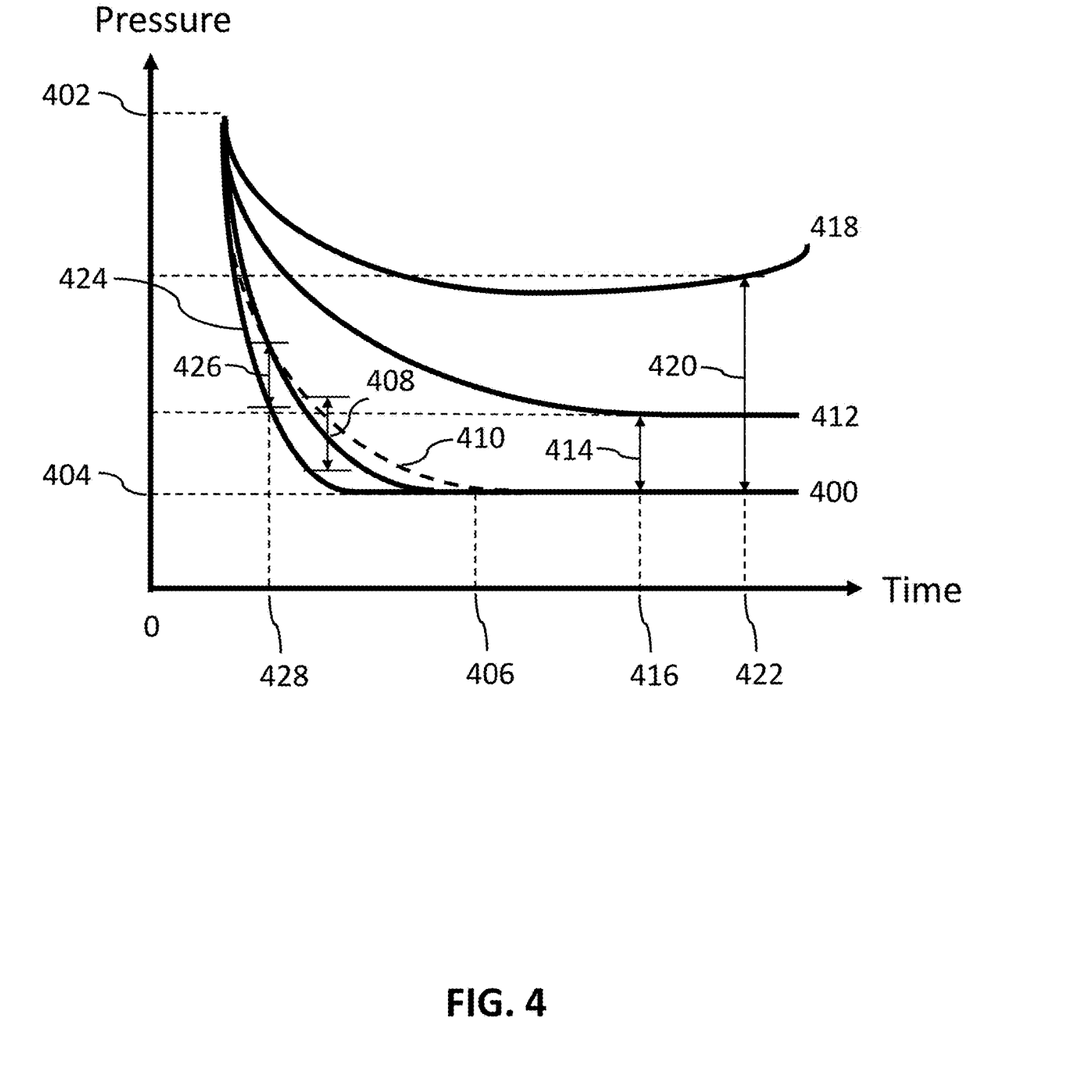
FIG. 4 is a graph showing evacuation pressure profiles.

FIG. 4 shows examples of test evacuation pressure profiles (e.g., pressure vs. time) under various leak conditions. A reference evacuation pressure profile 400 is obtained from a reference package that does not have a leak. If there is no leak in the package 100 being tested when the pump 214 is operating, the air flow path 300 is the dominating air flow path. As the air is being drawn from the storage space 105 into the conduit 212, the pressure measured by the sensor 216 quickly drops from an initial pressure 402 to a pre-determined vacuum pressure 404 within a first pre-determined time period 406. The air flow path 330 may affect the pressure drop; however, this affect is expected to be minimal and negligible. The initial pressure 402 is the pressure measured by the sensor 216 before the vacuum pump 214 is in operation. For example, the initial pressure 402 is the ambient atmospheric pressure. The pre-determined vacuum pressure 404 depends on the capability of the test system 200. For example, the pre-determined vacuum pressure 404 is a pressure in high vacuum region or when the pressure approaches its ultimate vacuum of the test system 200. For example, the pre-determined vacuum pressure 404 may be about 500 millibar (mbar). The first pre-determined time period 406 may be any suitable time duration sufficient to obtain an ultimate vacuum of the test system 200. For example, the second pre-determined time period 406 may be 10 seconds, 20, seconds, 30 seconds, 1 minute, etc.

The evacuation pressure profile of a reference package may deviate slightly depending on the package and/or on a different time that the reference package is tested. Therefore, any test package having an evacuation pressure profile close to matching the reference evacuation pressure profile 400 is considered a "good" package, i.e., no leak. A "no-leak" status can be determined for a test package if the deviation between the test evacuation pressure profile and the reference evacuation pressure profile is within a first pre-determined threshold 408 in the first pre-determined time period 406. The first pre-determined threshold 408 may be any suitable pre-determined statistical values, such as one standard deviation (1-sigma), two standard deviation (2-sigma), three standard deviation (3-sigma), four standard deviation (4-sigma), etc. For example, a test evacuation pressure profile 410 may deviate slightly from the reference evacuation pressure profile 400, but since the deviation is within the first pre-determined threshold 408, the test package is considered "good."

A test evacuation pressure profile 412 shows an example profile of a test package that has a leak between the closure element 112 and the coupling element 202 (e.g., the gasket 210). When the vacuum pump 214 is in operation, air flows into the conduit 212 through the air flow path 320, in addition to the air flow paths 300 and 330. Because of this, although the pressure measured by the sensor 216 drops from the initial pressure 402 as the air is being removed from the storage space 105, the pressure drop is not as steep as that in the reference evacuation pressure profile 400, and the evacuation pressure does not reach the pre-determined vacuum pressure 404 of the test system 200. If there is a leak between the closure material 112 and the coupling element 202 (e.g., the gasket 210), the test evacuation pressure profile 412 is above the reference evacuation pressure profile 400 exceeding a second pre-determined threshold 414 in a second pre-determined time period 416.

The second pre-determined threshold 414 may be any suitable values that are sufficient to distinguish from the reference evacuation pressure profile 400 and from the first pre-determined threshold 408. For example, the second pre-determined threshold 414 may be about 100 millibar (mbar). The second pre-determined time period 416 may be any suitable time duration sufficient to obtain a close to steady-state vacuum pressure. For example, the second pre-determined time period 416 may be 10 seconds, 20, seconds, 30 seconds, 1 minute, etc. The second pre-determined time period 416 may be the same, shorter, or longer than the first pre-determined time period 406.

The test evacuation pressure profile 418 is an example profile of a test package that has leaks in the body 102 or elsewhere in the package 100. When the vacuum pump 214 is in operation, air flows into the conduit 212 through the air flow path 310 in addition to the air flow paths 300 and 330. Due to the presence of the air flow path 310, the pressure drop is less steep than that of the test evacuation pressure profile 412, and the pressure does not approach the pre-determined vacuum pressure 404. The test evacuation pressure profile 418 can first decrease due to the suction of the vacuum pump 214 and then increase as the air continues to leak from the ambient atmosphere into the conduit 212. If there is a leak in the package 100 (including leaks in the body 102, in the film, wrapper, crimping element, or other separate part of the package 100 as noted above, and/or in the adhesive bond 116), the test evacuation pressure profile 418 is above the reference evacuation pressure profile 400 exceeding a third pre-determined threshold 420 in a third pre-determined time period 422.

The third pre-determined threshold 420 may be any suitable values that are sufficient to distinguish from the reference evacuation pressure profile 400 and the test evacuation pressure profile 412. For example, the third pre-determined threshold 420 may be about 100 millibar (mbar), 200 mbar, 300 mbar, etc. The third pre-determined time period 422 may be any suitable time duration sufficient to obtain a close to steady-state vacuum pressure. For example, the third pre-determined time period 422 may be 10 seconds, 20, seconds, 30 seconds, 1 minute, etc. The third pre-determined time period 422 may be the same, shorter, or longer than the first pre-determined time period 406 or the second pre-determined time period 416.

The test evacuation pressure profile 424 is an example profile of a test package that has a pinhole in the closure element 112. When the vacuum pump 214 is in operation, due to the presence of a pinhole, the air flow rate into the conduit 212 through the air flow path 300 can be greater than if there were no pinhole. As the result, the pressure drop may be steeper than that of the reference evacuation pressure profile 400. If there is a pinhole in the closure element 112, the test evacuation pressure profile 424 is below the reference evacuation pressure profile 400 exceeding a fourth pre-determined threshold 426 in a fourth pre-determined time period 428.

The fourth pre-determined threshold 426 may be any suitable values that are sufficient to distinguish from the reference evacuation pressure profile 400 and the test evacuation pressure profiles 410, 412, and 418. For example, the fourth pre-determined threshold 426 may be one standard deviation (1-sigma), two standard deviation (2-sigma), three standard deviation (3-sigma), or four standard deviation (4-sigma) below the reference evacuation pressure profile 400. The fourth pre-determined time period 428 may be any suitable time durations, such as 1 second, 2 seconds, 3 seconds, etc. The fourth pre-determined time period 428 may be the same or shorter than the first pre-determined time period 406.

Figure 5:
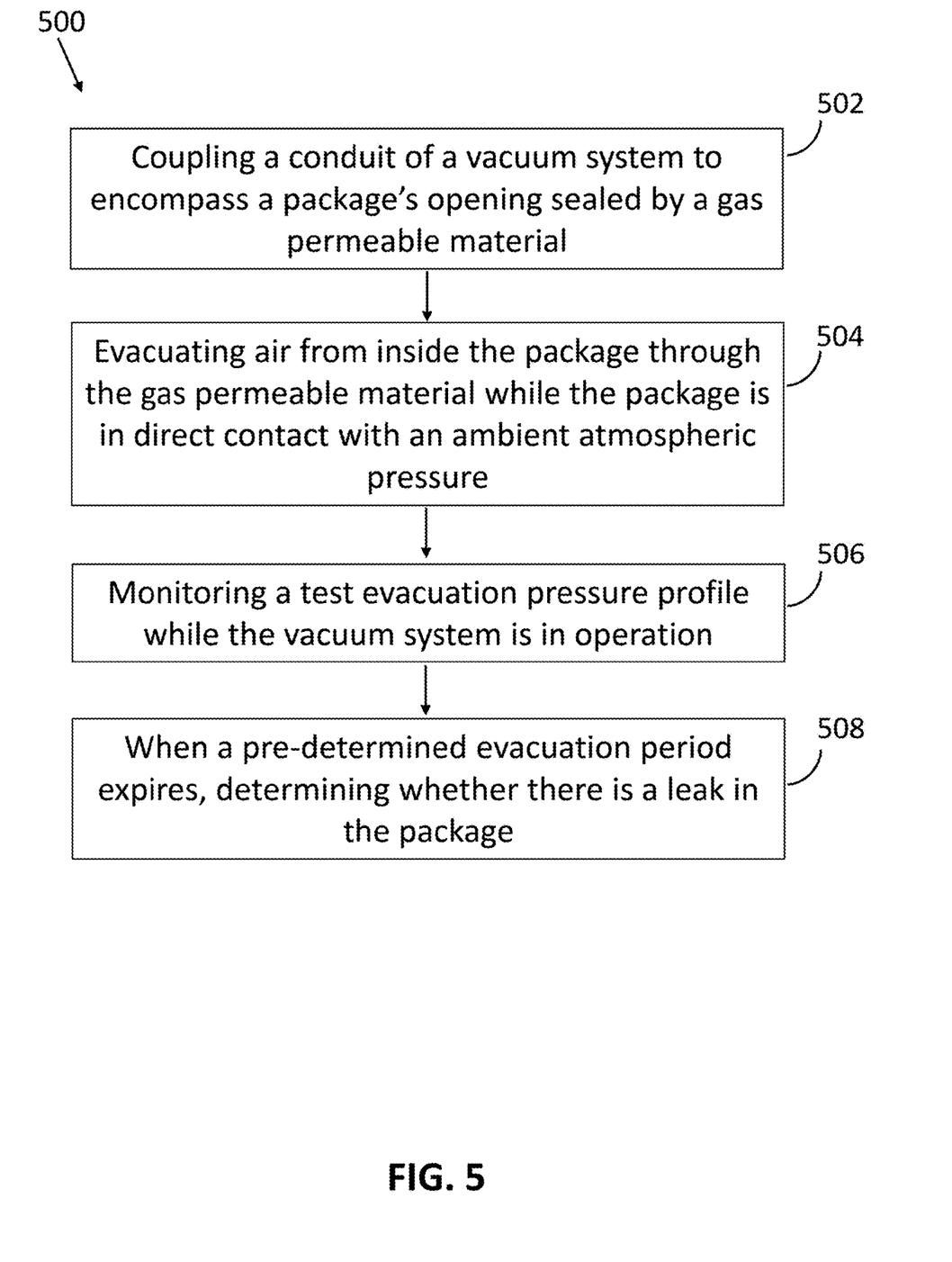
FIG. 5 is a block diagram of steps taken in performance of a leak test.

FIG. 5 shows a method 500 for leak testing a package 100 using the test system 200. The method 500 includes a step 502 of coupling a conduit of a vacuum system to the package 100 as described above with reference to FIG. 2. Step 502 may include applying and maintaining a compression force to press the coupling element 202 or the gasket 210 against the closure element 212 on the package 100.

The method 500 includes evacuating air from inside the package through 100 the gas-permeable material of the closure element 112 while the package 100 is in direct contact with an ambient atmospheric pressure (step 504) as described above with reference to FIG. 3. In step 504, the vacuum pump 214 pulls air from the package 100 through the closure element 112 and into the conduit 212.

Step 506 monitors a test evacuation pressure profile. A timer of the test system 200 is triggered which is the beginning of the evacuation period. The evacuation pressure is detected by the pressure sensor 216 and monitored by the controller 218.

When a pre-determined evacuation period expires, step 508 determines whether there is a leak in the package. The pre-determined evacuation period may be any suitable length of time to test the package 100. For example, the pre-determined evacuation period may be the first pre-determined time period 406, the second pre-determined time period 416, the third pre-determined time period 422, or the fourth pre-determined period 428. Step 508 includes determining whether there is a leak in the package 100 based on a comparison between the test evacuation pressure profile and a reference pressure profile of a reference package that does not have a leak, as discussed above with reference to FIG. 4.

Step 508 may include determining there is no leak in the package 100 if a deviation between the test evacuation pressure profile (e.g., the test evacuation profile 410) and the reference evacuation pressure profile 400 is within the first pre-determined threshold 408 in the first pre-determined time period 406. Step 408 may include determining there is a leak in the between the closure material 112 and the coupling element 202 (e.g., the gasket 210) and no leak in the package 100 if the test evacuation pressure profile 412 is above the reference evacuation pressure profile 400 exceeding the second pre-determined threshold 414 (but not exceeding the third pre-determined threshold 420) in the second pre-determined time period 416. Step 508 may include determining there is a leak in the package 100 if the test evacuation pressure profile 418 is above the reference evacuation pressure profile 400 exceeding the third pre-determined threshold 420 in the third pre-determined time period 422. Step 508 may include determining there is a pinhole in the closure element 112 if the test evacuation pressure profile 424 is below the reference evacuation pressure profile 400 exceeding the fourth pre-determined threshold 426 in the fourth pre-determined time period 428.

Figure 6:
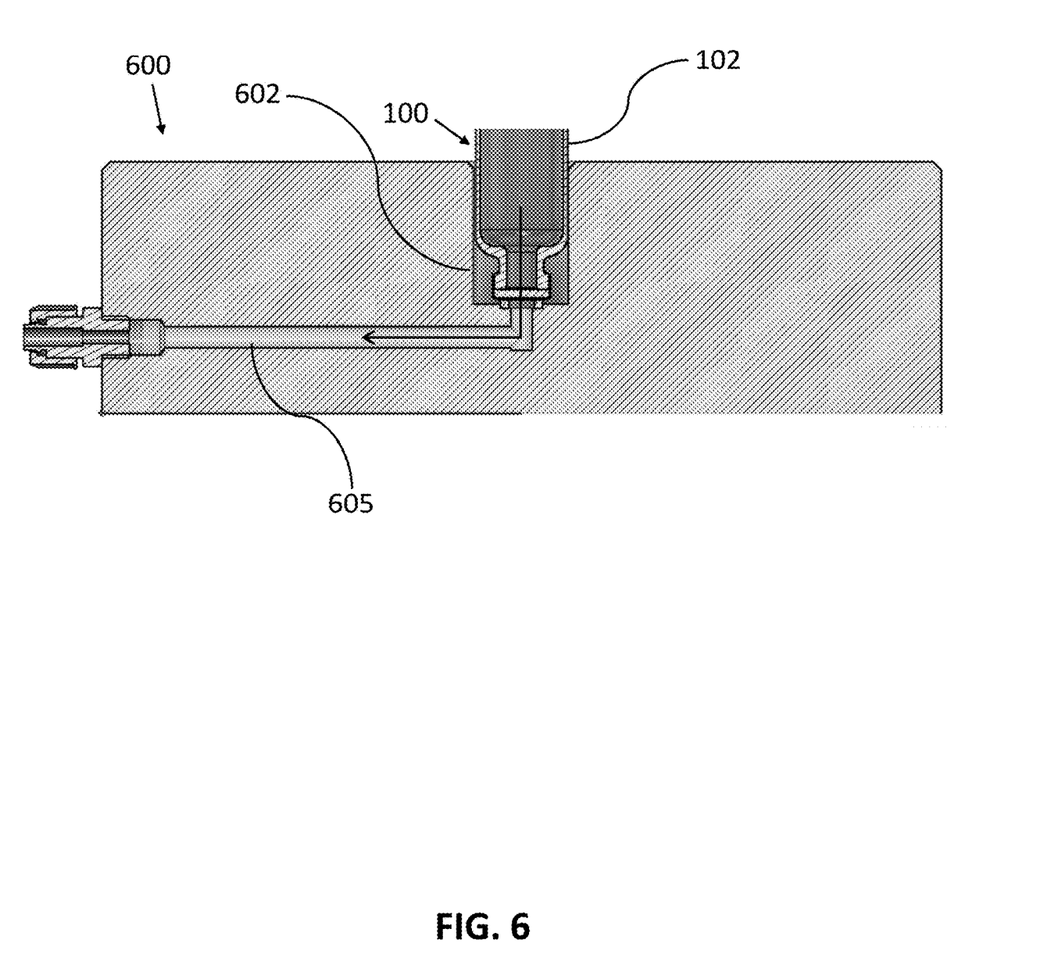
FIG. 6 is a side view of a coupling element for use in a leak testing system.

FIG. 6 shows another embodiment of a coupling element 600 for use in the test system 200. In this example, the coupling element 600 includes a seat 602 that is sized and shaped to receive the package 100 and hold it steady during the leak test process. Like the coupling element 202 of FIG. 2, this coupling element 600 defines an air flow passage 605 and, together with the package 100, enables air flow paths as described above with reference to FIG. 3.

Figure 7A:
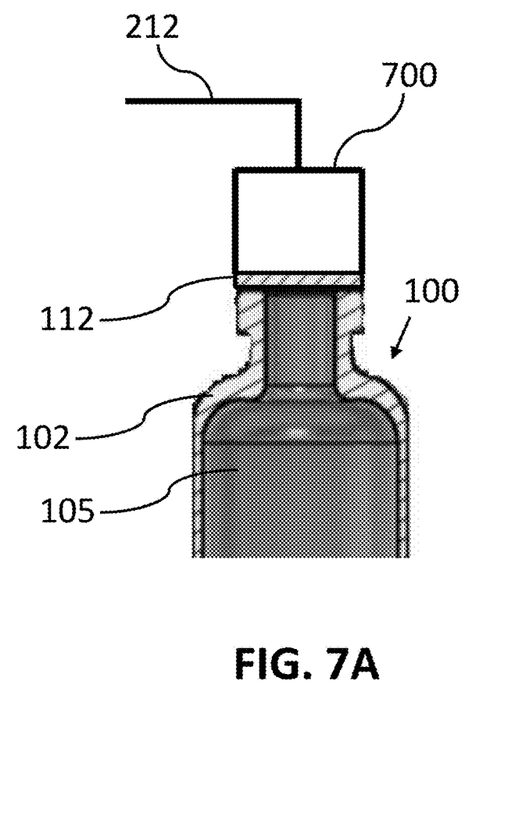
FIGS. 7A and 7B are schematic views of additional alternative embodiments of a coupling element for use in a leak testing system.
Figure 7B:
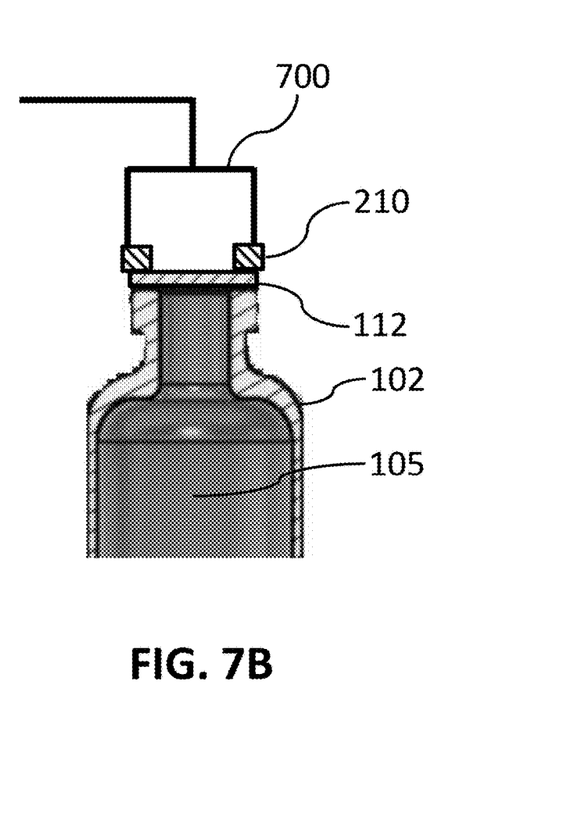

FIGS. 7A and 7B show additional examples of structures for coupling the package 100 with the test system 200. In these examples, a coupling element comprises a suction cup 700 that enables air flow paths from the package 100 directly to the conduit 212 in the system 200. As shown in FIG. 7A, the cup 700 is attached directly to the closure element 112 on the package 100. As shown in FIG. 7B, a gasket 702 is interposed between the suction cup 700 and the closure element 112.

Figure 8A:
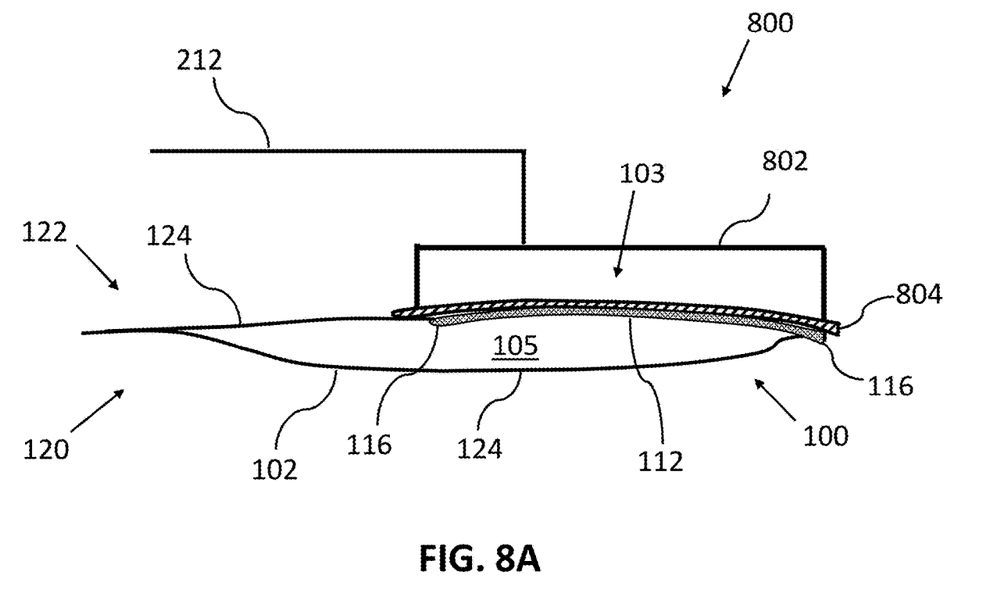
FIGS. 8A and 8B each shows a schematic view of an additional alternative embodiment of a coupling element for use in a leak testing system.
Figure 8B:
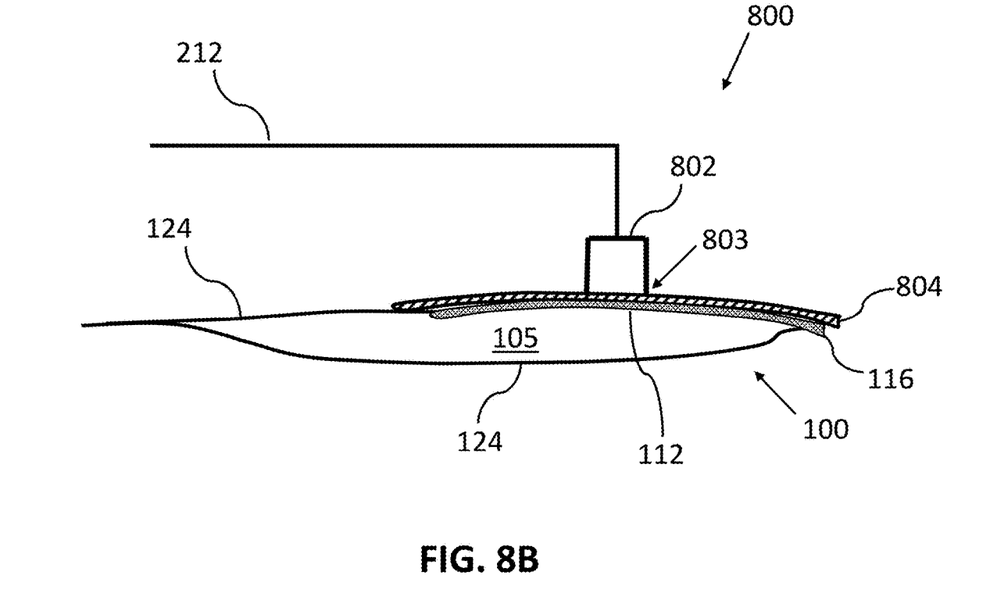

FIGS. 8A and 8B show additional examples of structures for coupling the package 100 with the test system 200. The package 100 is made of flexible material having a first side 120 and a second side 122 opposite to the first side 120. The storage volume 105 enclosed by the first side 120 and the second side 122. The opening 103 is located in the second side 122 and is enclosed by the first side 120 and the second side 122.

The first side 120 is made of a non-gas permeable material 124. The second side 122 is made of both the non-gas permeable material 124 and the gas permeable material of the closure element 112. The gas permeable material of the closure element 112 reaches over the opening 103 and the adhesive bond 116 attaches the gas permeable material of the closure element 112 to the body 102 of the package 100 besides the opening 103.

A coupling element 800 includes a suction cup 802 and a sheet of gas permeable material 804. The sheet of gas permeable material 804 is capable of being removably attached to the second side 122 of the package 100 to form a continuous contact with the gas permeable material of the closure element 112. The sheet of gas permeable material 804 may be made of silicone and it can keep the package 100 substantially flat during the leak testing.

The suction cup 802 is attached to the sheet of gas permeable material 804 as shown in FIG. 8A. Alternatively, the suction cup 802 may be connected to a port 803 fused into the sheet of gas permeable material 804 as shown in FIG. 8B. During the leak testing, the package 100 may be disposed on a relatively flat surface/support, and the suction cup 802 is disposed against the package 100 and enables air flow paths from the package 100 through the gas permeable material of the closure element 112 and through the sheet of gas permeable material 804 into the conduit 212 in the system 200. The suction cup 802 is sufficiently large to at least encompass the opening 103.

This written description sets forth the best mode of practicing the claimed invention, and describes the invention so as to enable a person of ordinary skill in the art to make and use the invention, by presenting examples of the elements recited in the claims. The detailed descriptions of those examples do not impose limitations that are not recited in the claims.

The invention claimed is:

1. A system for leak testing a package having a body with an opening, a gas permeable material reaching over the opening, and an adhesive bond attaching the gas permeable material to the body beside the opening, the system comprising:
   a coupling element configured to connect with the package to enable potential leakage air flow paths into the coupling element, including:
      a) from inside the package through the opening and further through the gas permeable material; and
      b) from an ambient atmosphere into the package and further through the gas permeable material;
   a vacuum system operatively connected to the coupling element via a conduit to apply test evacuation pressure to the potential leakage air flow paths;
   a pressure sensor operative to sense test evacuation pressure in the coupling element; and
   a controller configured to:
      monitor a test evacuation pressure profile in the coupling element;
      compare the test evacuation pressure profile to a reference evacuation pressure profile of a reference package that does not have a leak; and
      determine whether there is a leak in the package based on the comparison.

2. The system of claim 1, wherein the controller is configured to determine there is no leak in the package if a deviation between the test evacuation pressure profile and the reference evacuation pressure profile is within a first pre-determined threshold in a first pre-determined time period.

3. The system of claim 1, wherein the controller is configured to determine there is a leak between the gas permeable material and the coupling element and no leak in the body of the package if the test evacuation pressure profile is above the reference evacuation pressure profile exceeding a second pre-determined threshold in a second pre-determined time period.

4. The system of claim 1, wherein the controller is configured to determine (Original) there is a leak in the package if the test evacuation pressure profile is above the reference evacuation pressure profile exceeding a third pre-determined threshold in a third pre-determined time period.

5. The system of claim 1, wherein the controller is configured to determine there is a pinhole in the gas permeable material if the test evacuation pressure profile is below the reference evacuation pressure profile exceeding a fourth pre-determined threshold in a fourth pre-determined time period.

6. The system of claim 1, wherein the coupling element is further configured to enable a potential leakage gas flow path into the coupling element from the ambient atmosphere into the package and further through the gas permeable material beside the opening.

7. The system of claim 1, wherein the coupling element includes a gasket configured to be disposed between the conduit and the gas permeable material beside the opening.

8. The system of claim 1, wherein the coupling element includes a sheet of gas permeable material configured to be removably attached to the gas permeable material to keep the package flat during the leak testing.

9. A method of leak testing a package having a body with an opening, a gas permeable material reaching over the opening, and an adhesive bond attaching the gas permeable material to the body beside the opening, the method comprising:
   coupling a vacuum system to the package to enable potential leakage air flow paths into the vacuum system, including:
      a) from inside the package through the opening and further through the gas permeable material; and
      b) from an ambient atmosphere into the package and further through the gas permeable material;
   actuating the vacuum system to apply test evacuation pressure to the potential leakage air flow paths;
   monitoring a profile of the test evacuation pressure; and
   determining whether there is a leak in the package based on a comparison between the test evacuation pressure profile and a reference evacuation pressure profile of a reference package that does not have a leak.

10. The method of claim 9, further comprising determining there is no leak in the package if a deviation between the test evacuation pressure profile and the reference evacuation pressure profile is within a first pre-determined threshold in a first pre-determined time period.

11. The method of claim 9, further comprising determining there is a leak between the gas permeable material and the coupling element and no leak in the package if the test evacuation pressure profile is above the reference evacuation pressure profile exceeding a second pre-determined threshold in a second pre-determined time period.

12. The method of claim 9, further comprising determining there is a leak in the package if the test evacuation pressure profile is above the reference evacuation pressure profile exceeding a third pre-determined threshold in a third pre-determined time period.

13. The method of claim 9, comprising determining there is a pinhole in the gas permeable material if the test evacuation pressure profile is below the reference evacuation pressure profile exceeding a fourth pre-determined threshold in a fourth pre-determined time period.

14. The method of claim 9, wherein coupling the vacuum system to the package enables a potential leakage air flow path into the vacuum system from the ambient atmosphere into the package and further through the gas permeable material beside the opening.

15. The system of claim 1, wherein the coupling element comprises a seat that is sized and shaped to receive and hold the package.

16. The system of claim 1, wherein the coupling element comprises a suction cup that is configured to be removably attachable to the gas permeable material over the opening of the package.

17. The system of claim 7, wherein the coupling element comprises a suction cup that is configured to be removably attached to the gasket.

18. The system of claim 8, wherein the coupling element comprises a suction cup that is configured to be removably attached to the sheet of gas permeable material.

19. The system of claim 1, wherein the package comprises a non-gas permeable stopper beneath the opening.

20. The system of claim 1, wherein the coupling element is configured to connect with the package that is flexible.

\* \* \* \* \*